(12) United States Patent
Park et al.

(10) Patent No.: US 6,810,264 B1
(45) Date of Patent: Oct. 26, 2004

(54) POWER CONTROLLING APPARATUS AND METHOD IN MOBILE COMMUNICATION SYSTEM

(75) Inventors: Jin-Soo Park, Seoul (KR); Youn-Sun Kim, Seoul (KR); Jae-Min Ahn, Seoul (KR); Soon-Young Yoon, Seoul (KR); Hee-Won Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 496 days.

(21) Appl. No.: 09/714,313

(22) Filed: Nov. 16, 2000

(30) Foreign Application Priority Data

Nov. 16, 1999 (KR) .......................................... 1999/50768
Jan. 7, 2000 (KR) ............................................. 2000/728

(51) Int. Cl.$^7$ ............................................. H04B 7/216
(52) U.S. Cl. ......................... 455/522; 455/69; 370/278; 370/280; 370/441; 370/442; 370/477
(58) Field of Search .................... 455/522, 69; 370/318, 370/342, 210, 441, 278, 280, 252, 337, 335, 345, 442, 477–478, 479

(56) References Cited

U.S. PATENT DOCUMENTS

| | | | |
|---|---|---|---|
| 5,559,790 A | * | 9/1996 | Yano et al. ................... 370/342 |
| 5,703,902 A | | 12/1997 | Ziv et al. |
| 5,752,170 A | | 5/1998 | Clifford |
| 5,812,938 A | | 9/1998 | Gilhousen et al. |
| 5,987,333 A | | 11/1999 | Sole |
| 6,151,328 A | * | 11/2000 | Kwon et al. ................. 370/441 |
| 6,545,986 B1 | * | 4/2003 | Stellakis ...................... 370/318 |
| 6,590,873 B1 | * | 7/2003 | Li et al. ....................... 370/318 |
| 2002/0167913 A1 | * | 11/2002 | Leung ......................... 370/252 |

FOREIGN PATENT DOCUMENTS

JP    002236165    * 7/1999

OTHER PUBLICATIONS

European Search Report dated Apr. 15, 2003, issued in a counterpart application, namely, Appln. No. 00981845.1.
"Physical Layer Standard for CDMA2000 Spread Spectrum Systems, Version 1", Jul. 1999.
"Performance of closed–loop power control for a multiple–channel mobile station in the c system", W.Lee, N.P. Secord, Wireless Communications and Networking Conference, 1999, WC 912, Sep. 21–24, 1999.

* cited by examiner

*Primary Examiner*—Nay Maung
*Assistant Examiner*—Alan T. Gantt
(74) *Attorney, Agent, or Firm*—Dilworth & Barrese, LLP.

(57) ABSTRACT

A power controlling apparatus and method in a mobile communication system. A receiver in a mobile station multiplexes the frame reception result indicator bits for at least two traffic channels received from a transmitter in a base station, inserts the multiplexed frame reception result indicator bits in a pilot signal bit by bit, and transmits the reverse frame. Then, the transmitter extracts the pilot signal from the reverse frame, demultiplexes the frame reception result indicator bits, and performs a power control on the traffic channels based on the values of the frame reception result indicator bits.

26 Claims, 22 Drawing Sheets

FRAME RECEPTION RESULT INDICATOR BITS FOR FIRST TRAFFIC CHANNEL

FRAME RECEPTION RESULT INDICATOR BITS FOR SECOND TRAFFIC CHANNEL

SEQUENCE WORD WITH FRAME RECEPRION RESULT INDICATOR BITS FOR FIRST AND SECOND TRAFFIC CHANNELS WORD LENGTH 16, 4 WORDS AVAILABLE

POWER CONTROLLING APPARATUS AND METHOD IN MOBILE COMMUNICATION SYSTEM

PRIORITY

This application claims priority to an application entitled "Apparatus and Method for Reporting Frame Reception Results in Mobile Communication System" filed in the Korean Industrial Property Office on Nov. 16, 1999 and assigned Ser. No. 99-50768 and another application entitled "Power Controlling Apparatus and Method in Mobile Communication System" filed in the Korean Industrial Property Office on Jan. 7, 2000 and assigned Ser. No. 2000-728, the contents of which are hereby incorporated by reference.

BACKGROUND OF THE INVENTION

1. Field of the Invention

The present invention relates generally to a mobile communication system, and in particular, to an apparatus and method for reporting the result of frame reception in a CDMA (Code Division Multiple Access) mobile communication system.

2. Description of the Related Art

Reporting the result of frame reception is a process where a receiver determines the reception state of a frame and transmits the determined state to a transmitter. The reception state may represent a CRC check result, the energy level of the received frame, or a different kind of reception quality. Based on the frame reception result, the transmitter performs power control for the receiver.

A receiver in a conventional mobile communication system, however, reports the reception result of a frame on one channel only to a transmitter. Therefore, when frames are received on two or more channels simultaneously, a report is made on only one of the channels.

The conventional reporting of a frame reception result will be described in more detail in conjunction with a CDMA mobile communication system standardized in TIA TR45.5/3GPP2 (referred to as a CDMA 2000 system). It is assumed that the transmitter is in a base station and the receiver in a mobile station. The CDMA 2000 system uses a fundamental channel (FCH), a dedicated control channel (DCCH), a supplemental channel (SCH), and a supplemental code channel (SCCH) as traffic channels.

Two cases may be considered in describing the reporting of a frame reception result: using one traffic channel as shown in FIG. 1A and using at least two traffic channels as shown in FIG. 1B.

Referring to FIG. 1A, a base station transmitter $110a$ transmits a frame on one of the traffic channels to a mobile station receiver $120a$ and the mobile station receiver $120a$ reports the reception result of the frame back to the base station $110a$. In this case, frame reception and reporting of the reception result occur only on one channel, thereby avoiding the problem of excluding other traffic channels from reporting reception results. It is clear, however, that such an operation cannot provide services on a plurality of traffic channels.

Referring to FIG. 1B, a transmitter $110b$ transmits frames on at least two traffic channels, that is, a first traffic channel frame and a second traffic channel frame to a receiver $120b$ and the receiver $120b$ reports a reception result back to the transmitter $110b$. In this case, while the first and second traffic channel's frames are received, only the reception result of the first traffic channel frame is reported to the transmitter $110b$, excluding the second traffic channel frame from the reporting operation. The first traffic channel can be the FCH or the DCCH and the second traffic channel can be the SCH or the SCCH.

FIG. 2 illustrates the temporal relationship between a frame received on a traffic channel and a transmit frame having the reception result of the received frame in the conventional technology. Referring to FIG. 2, if the receiver receives an $(i+1)^{th}$ frame on the traffic channel, it transmits the reception result of the $(i+1)^{th}$ frame in an $(i+3)^{th}$ frame after two frames. The two frame-delay happens because frames are transmitted and received in synchronization at the mobile station and thus the reception result of the $(i+1)^{th}$ receive frame cannot be transmitted in an $(i+1)^{th}$ transmit frame. In addition, the time required to process the $(i+1)^{th}$ received frame makes it impossible to transmit the reception result of the $(i+1)^{th}$ received frame in an $(i+2)^{th}$ transmit frame. In FIG. 2, one frame is 20 ms in duration.

FIG. 3A illustrates a multiplexer (MUX) for multiplexing frame reception result indicator bits and a multiplexing method in the receiver operated as in FIGS. 1A and 1B. In FIG. 3A, a pilot and a power control bit (PCB) are multiplexed in time to a reverse pilot channel in the CDMA 2000 system. FIG. 3B illustrates the structure of a power control group (PCG). One 20-ms frame includes 16 PCGs, each PCG having a pilot and a PCB. The PCB can be replaced by a reception result indicator bit. Each PCB has a unique value in a corresponding PCG, enabling a fast power control at a rate of up to 800 Hz, the reception result indicator bit has a fixed value in one frame. Therefore, the base station transmitter performs a slow power control at 50 Hz using the reception result indicator bit. Hereinafter, a bit indicative of power control information or reception result information such as the PCB or the reception result indicator bit will be referred to as a "control bit". In the CDMA 2000 system, a control bit occurs 16 times in one 20-ms frame because one 20-ms frame includes 16 1.25-ms PCGs, each PCG having a unique control bit. One 1.25-ms PCG is divided into four 0.3125-ms groups, each having 384N chips. The last of the four groups is reserved for the control bit. Let a spreading rate of 1.2288 Mcps be 1. Then, 384 means the number of chips in one group and N is a spreading rate. For example, if a spreading rate is 3, that is, 3.6864 Mcps, 384×3 chips are assigned to each group by $$\text{chip number} = 1.25 \text{ ms} \times \frac{1.2288 \text{ Mcps}}{1 \text{ sec}} \times N \quad (1)$$

When frame reception result indicator bits are used as the control bits in the conventional technology, 16 power control bits in one frame are set to represent one reception result value. In other words, the reception result of a frame on one traffic channel is set in 16 PCBs.

FIG. 4A illustrates the structure of a frame containing a reception result reported by the conventional mobile station. In FIG. 4A, all frame reception result indicator bits in one frame are set to an identical value, that is, they represent the reception result of one received frame.

Referring back to FIG. 1B, the base station $110b$ transmits the first and second traffic channels to the mobile station $120b$ but the mobile station $120b$ reports the reception result of only one channel, i.e., the first traffic channel in the frame shown in FIG. 4.

The reception result may be used for the base station to control the transmission power of the mobile station. If the reception result has been reported as good, the base station instructs the mobile station to gradually reduce its transmission power and vice versa, so that the mobile station can receive a signal at an acceptable quality level. This is a slow power control on a frame basis that may be implemented only if a fast power control is not feasible. The fast power control occurs 16 times per frame. The first traffic channel may differ from the second traffic channel in data rate, code rate, and QoS (Quality of Service) requirements. This implies that it is necessary to implement power control on the traffic channels separately because of the difference in characteristics between the traffic channels.

However, when reporting a reception result is limited to one channel as in the conventional technology, it is impossible to control the transmission powers of the other channels.

Meanwhile, a fast power control using PCBs may be used for power control of two traffic channels. That is, the mobile station transmitter transmits the PCBs for the fast power control on each of the two traffic channels. However, fast power control is not reliably done if an SCH is transmitted in a DTX (Discontinuous Transmission) mode or at a variable rate. In the DTX mode, an outer loop set point is not maintained appropriately, and at a variable rate, the requirement of rate detection before PCB transmission is not satisfied.

SUMMARY OF THE INVENTION

It is therefore an object of the present invention to provide an apparatus and method for reporting the reception results of all channels in current use in a mobile communication system.

It is another object of the present invention to provide an apparatus and method for assigning a given number of frame reception result indicator bits for traffic channels in one frame according to the number of the traffic channels.

It is still another object of the present invention to provide an apparatus and method for multiplexing bits indicating the reception results of at least two channels by a receiver upon receiving the at least two channels and efficiently controlling the transmission power of the at least two channels by a transmitter.

To achieve the above objects, a receiver in a mobile station multiplexes the frame reception result indicator bits for at least two traffic channels received from a transmitter in a base station, inserts the multiplexed frame reception result indicator bits in a pilot signal bit by bit, and transmits the reverse frame. Then, the base station extracts the pilot signal from the reverse frame, demultiplexes the frame reception result indicator bits, and performs a power control on the traffic channels based on the values of the frame reception result indicator bits.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 1A:
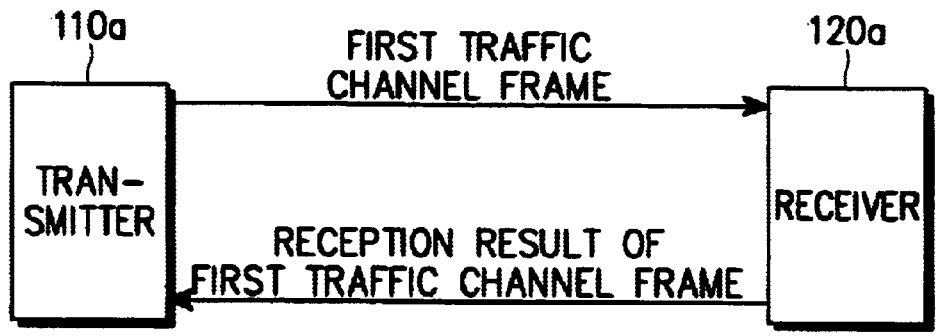
FIG. 1A illustrates a conventional operation of reporting a frame reception result in a mobile communication system.
Figure 1B:
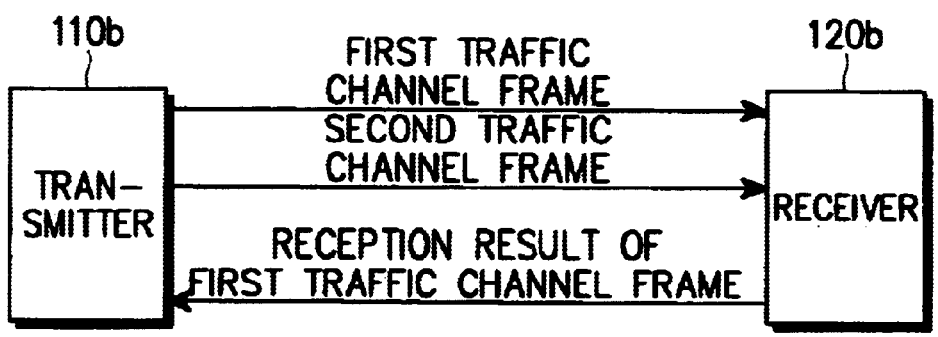
FIG. 1B illustrates another conventional operation of reporting a frame reception result in the mobile communication system.
Figure 1C:
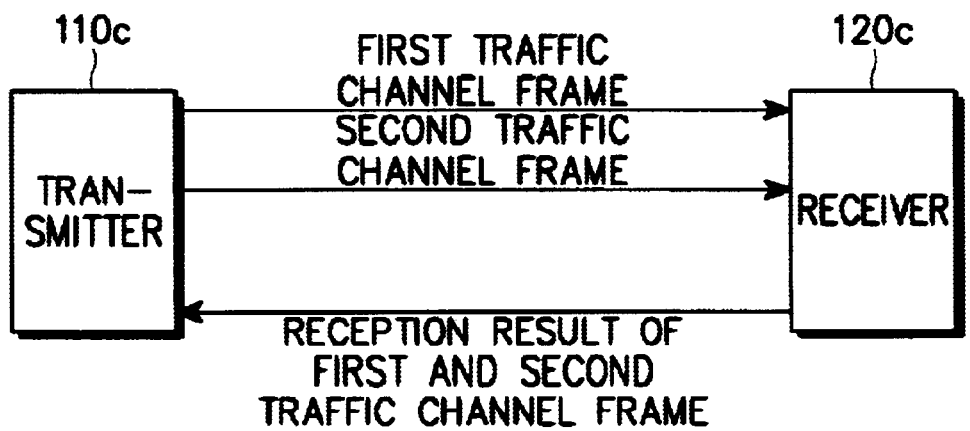
FIG. 1C illustrates an operation of reporting frame reception results in a mobile communication system according to an embodiment of the present invention.
Figure 2:
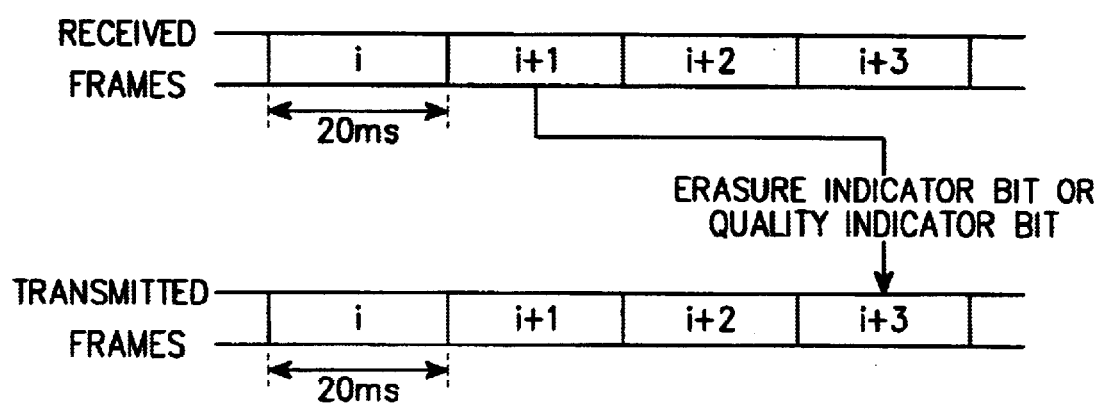
FIG. 2 illustrates a frame delay generally involved in reporting a frame reception result in the conventional mobile communication system.
Figure 3A:
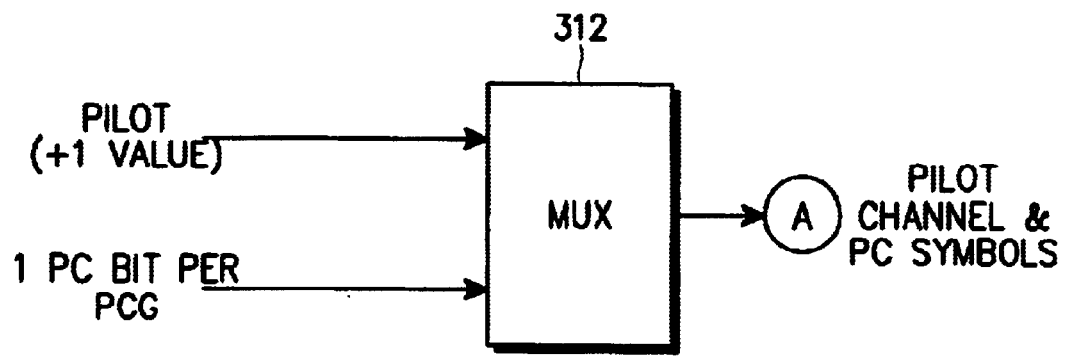
FIG. 3A illustrates multiplexing of frame reception result indicator bits in a conventional receiver.
Figure 3B:
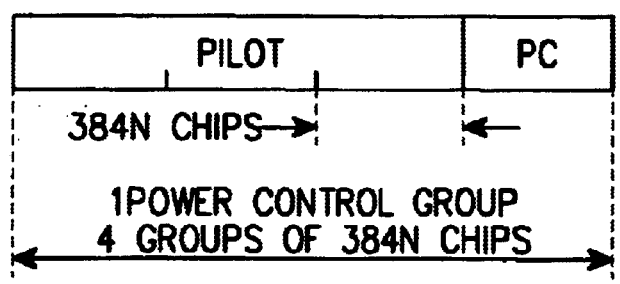
FIG. 3B illustrates the structure of a conventional PCG.

FIG. 1C illustrates generally how a mobile station reports reception results according the present invention. Referring to FIG. 1C, a transmitter (base station) 110c transmits a first traffic channel frame and a second traffic channel frame to a receiver (mobile station) 120c. The mobile station 120c multiplexes the reception results of the first and second traffic channel frames prior to transmission. The base station 110c can perform a slow power control or a fast power control according to the reception results. This operation also applies to other cases with more than two traffic channels.

Figure 4A:
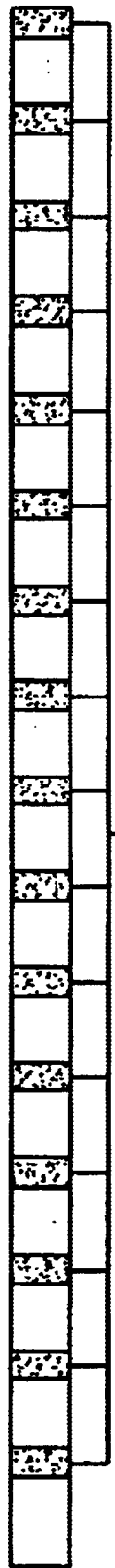
FIG. 4A illustrates the structure of a frame used for the conventional reception result reporting.
Figure 4B:
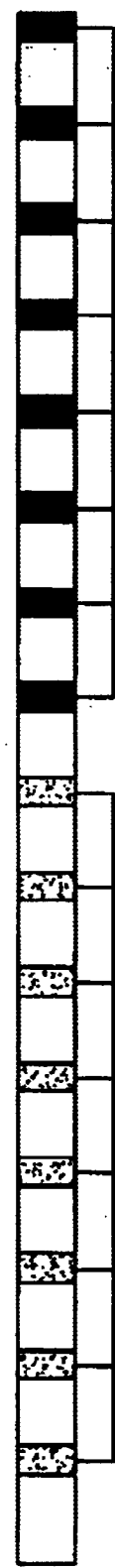
FIG. 4B illustrates an embodiment of a frame structure for reception result reporting according to the present invention.

FIG. 4B illustrates an embodiment of a frame structure for reception result reporting according to the present invention. If a base station transmits a first traffic channel frame and a second traffic channel frame, a mobile station multiplexes a reverse pilot signal and frame reception result indicator bits in time prior to transmission as in the conventional method. However, the present invention differs since 16 frame reception result indicator bits form a value for one channel reception result in one frame in the conventional method, whereas the first 8 control bits are set as frame reception result indicator bits to indicate the reception result of the first traffic channel frame and the last 8 control bits are set as frame reception result indicator bits to indicate the reception result of the second traffic channel frame in the present invention. While the same number of bits are assigned as each traffic channel frame reception result indicator bits, each traffic channel reception result can be represented with a different number of frame reception result indicator bits (e.g., 10:6).

Figure 4C:
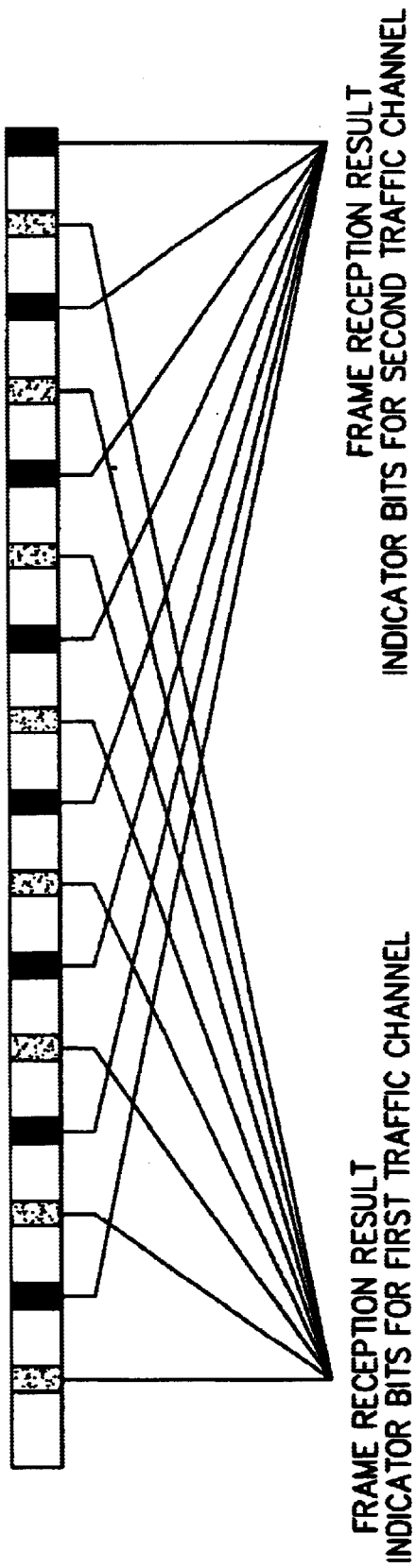
FIG. 4C illustrates another embodiment of the frame structure for reception result reporting according to the present invention.

FIG. 4C illustrates another embodiment of the frame structure for reception result reporting according to the present invention. In FIG. 4C, control bits in a reverse frame are assigned alternately as a reception result indicator bit for the first traffic channel frame and a reception result indicator bit for the second traffic channel frame. The odd-numbered control bits are set as the frame reception result indicator bits for the first traffic channel frame and the even-numbered control bits are set as the frame reception result indicator bits for the second traffic channel frame.

Many other modifications can be made to the patterns of frame reception result indicator bits shown in FIGS. 4A and 4B in multiplexing the reception results of two or more traffic channels, while staying within the scope and spirit of the present invention.

Figure 4D:
FIG. 4D illustrates a third embodiment of the frame structure for reception result reporting according to the present invention.

FIG. 4D illustrates a third embodiment of the frame structure for reception result reporting according to the present invention. In FIG. 4D, the reception results of the traffic channel frames are encoded to a codeword with length 16. Diverse codes representing the reception results may be contemplated. According to the present invention, since the codewords are defined to report the states of the first and second traffic channels, they must be mutually orthogonal. Table 1 illustrates an example orthogonal codeword set indicating the states of the first and second traffic channels.

TABLE 1

| Reception result of first traffic channel | reception result of second traffic channel | 16-bit codewords |
| --- | --- | --- |
| good | Good | 0000000000000000 |
| good | Bad | 0101010101010101 |
| bad | Good | 0011001100110011 |
| bad | Bad | 0110011001100110 |

In Table 1, the codeword "0000000000000000" represents that the reception results of both the traffic channels are good. The codeword "0101010101010101" represents that the reception result of the first traffic channel is good but that of the second traffic channel is bad. The codeword "0011001100110011" represents that the reception result of the first traffic channel is bad but that of the second traffic channel is good. The codeword "0110011001100110" represents that the reception results of both traffic channels are bad. One code symbol is assigned to each of 16 slots in one frame. As noted from Table 1, the codewords are mutually orthogonal so that the receiver can recover a received codeword despite possible errors.

The orthogonal codes listed in Table 1 are a mere exemplary application. Hence, any code having good performance in correcting errors is feasible as stated before. In addition, while reception results are simply classified as "good" or "bad" in Table 1, more information, for example, CRC check results and received energy level can be incorporated in the reception results.

Upon receipt of a frame encoded in the manner as described above, the base station multiplies a 16-bit codeword in the frame by each of the four orthogonal codes shown in Table 1 and selects a reception result corresponding to an orthogonal code with the highest correlation value. For example, if the 16-bit codeword has the highest correlation to the orthogonal code "0000000000000000", the base station concludes that the mobile station received the first and second traffic channel with good reception quality.

Figure 4E:
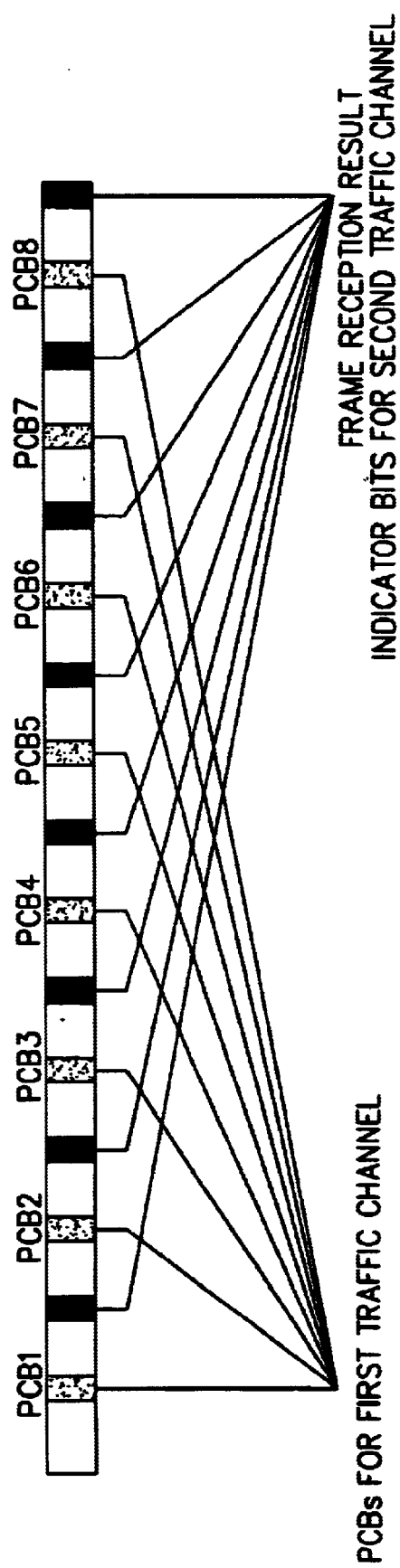
FIG. 4E illustrates a fourth embodiment of the frame structure for reception result reporting according to the present invention.

FIG. 4E illustrates a fourth embodiment of a frame structure for reception result reporting according to the present invention. The fourth embodiment is the same as the above three embodiments in so much as the base station transmits a first traffic channel frame and a second traffic channel frame and the mobile station multiplexes a reverse pilot signal and first and second traffic control bits in time prior to transmission, except that, in this case the power control bits are inserted in the positions of the first traffic control bits instead of the frame reception result indicator bits. That is, the power control bits each having a separate value are transmitted for the first traffic channel, while frame reception result indicator bits are transmitted for the second traffic channel, having one value in one frame. The base station transmitter 110c is capable of performing a fast power control at 400 Hz for the first traffic channel and a slow power control at 50 Hz for the second traffic channel.

The power control bits are the same in number as the frame reception result indicator bits and they alternate in the frame in FIG. 4E, but obviously, they may differ in number with a different pattern. Furthermore, this embodiment applies to other cases with more than two traffic channels.

Figure 4F:
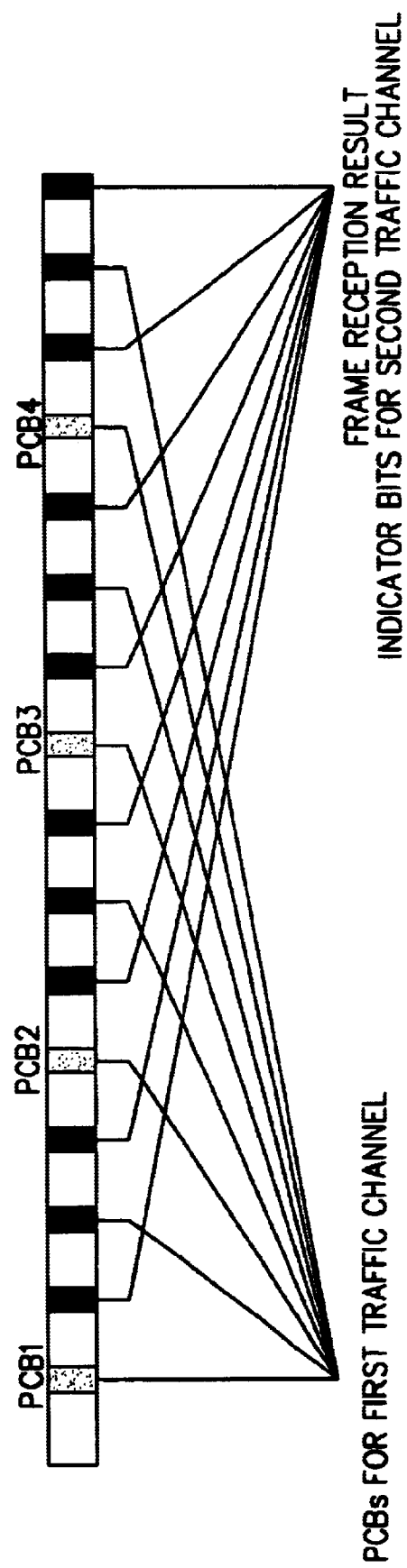
FIG. 4F illustrates a fifth embodiment of the frame structure for reception result reporting according to the present invention.

FIG. 4F illustrates a fifth embodiment of the frame structure for reception result reporting according to the present invention. In FIG. 4F, the power control bits and the frame reception result indicator bits are assigned 1:3 in number in a reverse frame.

Figure 5:
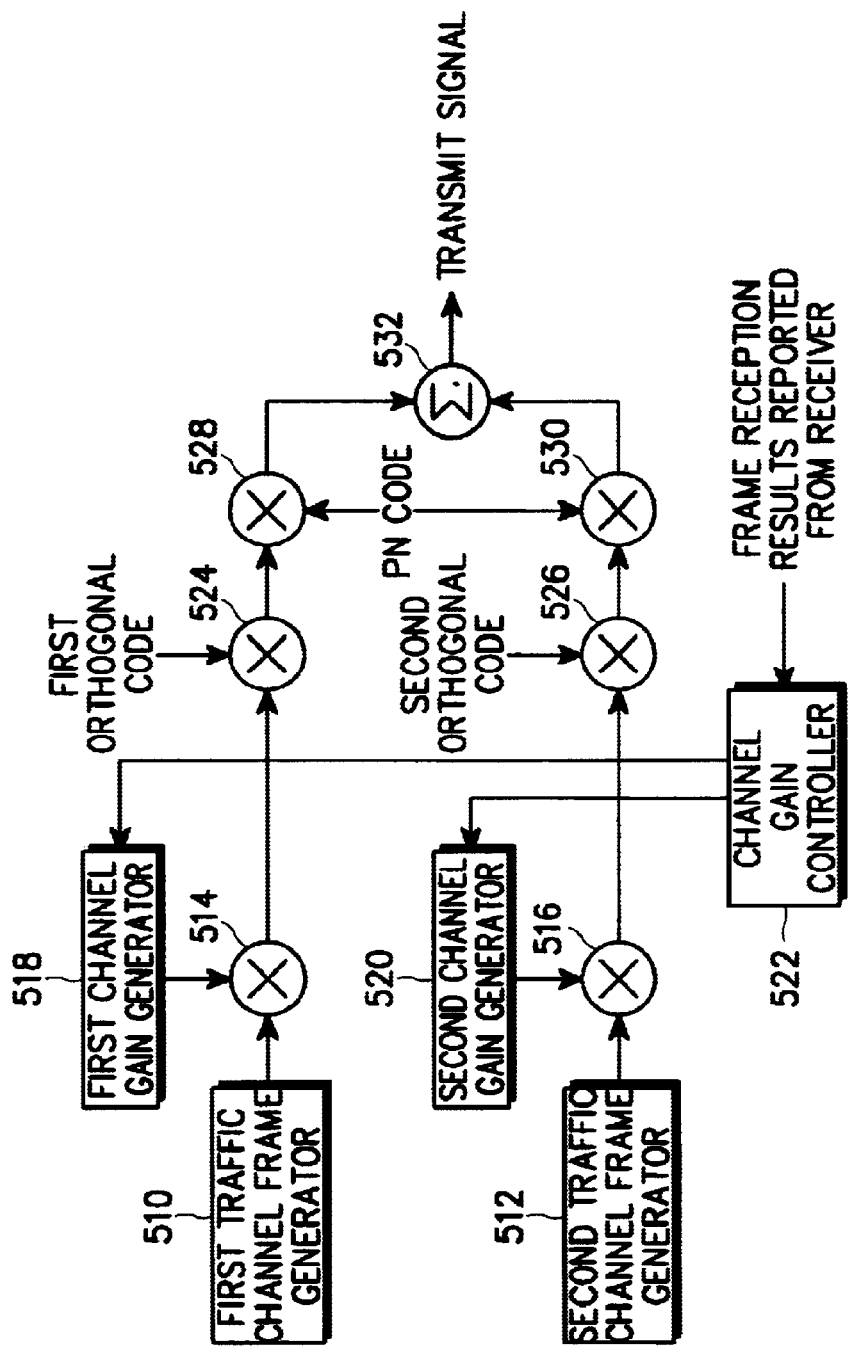
FIG. 5 is a block diagram illustrating a base station transmitter in the mobile communication system according to the present invention.

FIG. 5 is a block diagram of a base station transmitter according to the present invention. Referring to FIG. 5, a first traffic channel frame generator 510 generates a first traffic channel frame. A multiplier 514 multiplies the first traffic channel frame by a first channel gain. A second traffic channel frame generator 512 generates a second traffic channel frame. A multiplier 516 multiplies the first traffic channel frame by a second channel gain. A channel gain controller 522 transmits a control signal for controlling the gains of the traffic frames based on frame reception results received from a receiver. A first gain generator 518 generates the first channel gain under the control of the channel gain controller 522, and a second gain generator 520 generates the second channel gain under the control of the controller 522. A multiplier 524 multiplies the output of the multiplier 514 by a first orthogonal code and a multiplier 526 multiplies the output of the multiplier 516 by a second orthogonal code. Multipliers 528 and 530 spread the outputs of the multipliers 524 and 526, respectively, with a predetermined PN code. An adder 532 adds up the outputs of the multipliers 528 and 530 and transmits the sum signal. The same result can be achieved if the outputs of the multipliers 524 and 526 are added and then spread with the same PN code.

In operation, the first and second traffic channels frame generators 510 and 512 generate the first and second traffic channel frames, respectively. The multiplier 514 multiplies the first traffic channel frame by the first channel gain generated from the first channel gain generator 518. The multiplier 516 multiplies the second traffic channel frame by the second channel gain generated from the second channel gain generator 520. The first and second channel gains are determined by the channel gain controller 522 based on the reception results received from the receiver. The multiplier 524 multiplies the gain-controlled first traffic channel frame by the first orthogonal code and the multiplier 526 multiplies the gain-controlled second traffic channel frame by the second orthogonal code. The multipliers. 528 and 530 spread the outputs of the multipliers 524 and 526 with the predetermined PN code, respectively. The adder 532 adds up the outputs of the multipliers 528 and 530 to a common transmission signal.

As stated above, the channel gain controller. 522 controls the channel gains based on the reported reception results. To do so, an additional component is needed to extract symbols indicating the reception results of the traffic channels from a frame received from the receiver because the receiver transmits the frame reception results in many symbols in the frame. The component is illustrated in detail in FIGS. 7C, 8C, 9C, and 10B.

If it is reported that the first traffic channel has been received in a good state, the transmission power of the first and second traffic channels are decreased slowly at the same rate. On the other hand, if it is reported that the first traffic channel has been received in a bad state, the transmission power of the first and second traffic channels are increased slowly at the same rate. This operation encounters no problems if the reception results of the first and second traffic channel frames are identical. In other words, if the reception result of the first traffic channel frame is similar to that of the second traffic channel frame, the transmission power of the first and second traffic channels are gradually decreased or increased at the same rate with the ratio in transmission power of the second traffic channel to the first traffic channel maintained. However, if the reception results of the traffic channel frames are different as in many cases, it is not desirable to control the transmission power while the relative rate of the transmission power of the second traffic channel is maintained. Therefore, if it is determined that different reception results are continuously reported about the first and second traffic channels, a power control is performed with a changed ratio of the second traffic channel transmission power to the first traffic channel. As far as the control of the power ratio is concerned, the transmission power of the first traffic channel is decreased with that of the second traffic power maintained if the reception result of the first traffic channel frame is good and that of the second traffic channel frame is bad. In this manner, the transmission power ratio is adjusted until the reception results of the traffic channel frames are both bad. Then, with the power ratio of the traffic channels maintained constant, a power control is implemented, thereby keeping the reception quality at an acceptable level. The power control will be described later in more detail along with a description of the receiver.

Figure 6A:
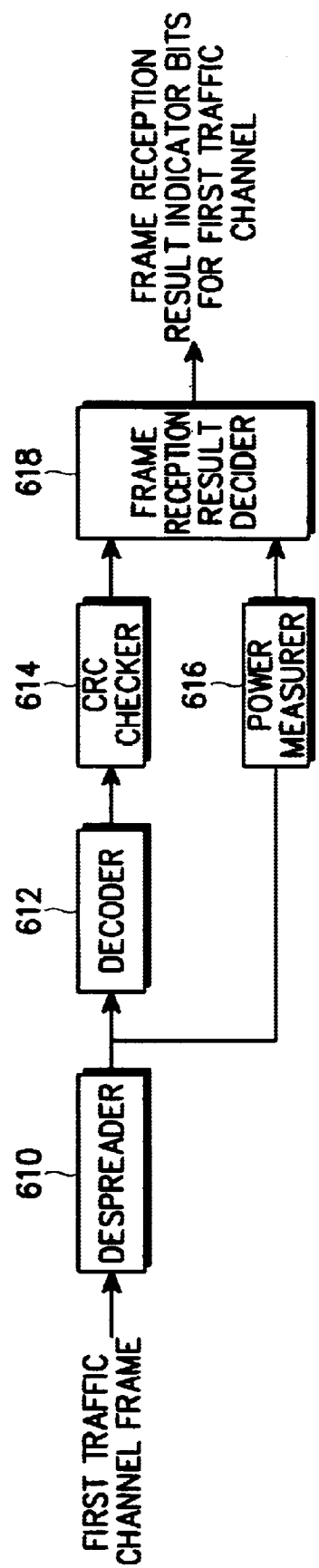
FIG. 6A is a partial block diagram illustrating a mobile station receiver in conjunction with reception of a first traffic channel frame in the mobile communication system according to the present invention.

FIG. 6A is a partial block diagram of a mobile station receiver in conjunction with reception of a first traffic channel frame in the mobile communication system according to the present invention. Referring to FIG. 6A, a despreader 610 despreads the first traffic channel frame received on a forward link with a PN sequence. A decoder 612 despreads the PN-despread signal with an orthogonal code for the corresponding channel. The orthogonal code can be a Walsh code and the channel can be a user traffic channel. A CRC checker 614 checks the CRC of the orthogonally despread signal. A power measurer 616 measures the power of the PN-despread signal and determines whether the measurement is sufficient or insufficient. For example, if the power of the PN-despread signal is greater than a reference power level, it is considered sufficient and otherwise, it is considered insufficient. A frame reception result decider 618 decides the reception result of the first traffic channel frame based on the power measurement and outputs frame reception result indicator bits for the first traffic channel frame.

Figure 6B:
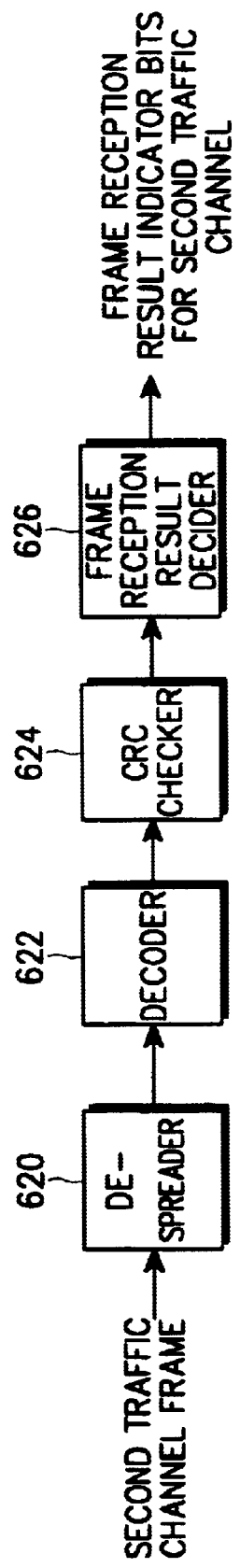
FIG. 6B is a partial block diagram illustrating a mobile station receiver in conjunction with reception of a second traffic channel frame in the mobile communication system according to the present invention.

FIG. 6B is a partial block diagram of the mobile station receiver in conjunction with reception of a second traffic channel frame in the mobile communication system according to the present invention. The portion for receiving the second traffic channel frame is the same in configuration as the first traffic channel frame receiving portion except that the power measurer is omitted in FIG. 6B. This is because the first traffic channel frame includes power measurement information but the second traffic channel frame does not. Since the second traffic channel frame has CRC check information only and, the second traffic channel is virtually released in terms of effects while the CRC information is not received. Accordingly, a frame reception result decider 626 decides the reception result of the second traffic channel frame based on a CRC check result received from a CRC checker 624 and outputs frame reception result indicator bits for the second traffic channel frame.

The difference in configuration between the first traffic channel frame receiving portion shown in FIG. 6A and the second traffic channel receiving portion shown in FIG. 6B is attributed to lack of energy measurement symbols in the second traffic channel frame in comparison with the first traffic channel frame. In other words, CRC check and energy measuring are required to decide the reception result of the first traffic channel frame, whereas only CRC check is required to decide the reception result of the second traffic channel frame. It is to be noted here that while signals input to the despreaders 610 and 620 should be called an input signal frame, a term that covers signals received on all channels, they are referred to as the first and second traffic channel frames for clarity of description.

Referring to FIGS. 6A and 6B, a description of the operation of the mobile station receiver according to the present invention follows. The first and second traffic channel frames are applied to the input of the despreaders 610 and 620, respectively. The despreaders 610 and 620 multiply the first and second traffic channel frames by a PN code. The PN-despread signal of the despreader 610 is fed to the decoder 612 and the power measurer 616 and the PN-despread signal of the despreader 620, to a decoder 622.

The decoders 612 and 622 despread the PN-despread signals with corresponding orthogonal codes. The CRC checkers 614 and 624 check the CRCs of the orthogonally despread signals. The power measurer 616 measures the power of non-PCBs and PCBs in a predetermined period of the first traffic channel frame received from the despreader 610. Specifically, the power measurer 616 determines whether the power of the first traffic channel frame is sufficient or insufficient by accumulating the power of the non-PCBs and the PCBs in the predetermined period of the first traffic channel frame and comparing the accumulated value with a reference power value.

The frame reception result decider 618 generates a reception result indicator bit for the first traffic channel frame based on the CRC check result received from the CRC checker 614 and the decision result received from the power measurer 616 as shown in Table 2.

TABLE 2

| CRC Power Value | good | Bad |
|---|---|---|
| sufficient | 1 | 1 |
| insufficient | 1 | 0 |

In Table 2, if the power measurement is not greater than the reference power value and the CRC check result is bad, the reception result indicator bit is set to "0". In the other cases, the reception result indicator bit is set to "1".

The frame reception result decider 626 shown in FIG. 6B generates a reception result indicator bit for the second traffic channel frame based on a CRC check result received from the CRC checker 624. For example, if the CRC check result is good, the reception result indicator bit is set to "1", indicating good reception and otherwise, it is set to "0", indicating bad reception.

The reception results bits for the first and second traffic channel frames must be incorporated in one frame prior to transmission. Embodiments of a structure for forming a frame including the frame reception result indicator bits in the receiver are illustrated in detail in FIGS. 7A, 8A, 9A, and 10A.

Hereinbelow, a description will be made on transmission of the frame reception result indicator bits in symbols in one frame and extraction of the symbols representative of the frame reception results from the frame.

Embodiments of a device for reporting the reception results of traffic channels in one frame will first be given in connection with FIGS. 7A, 8A, 9A, and 10A.

First Embodiment

Figure 7A:
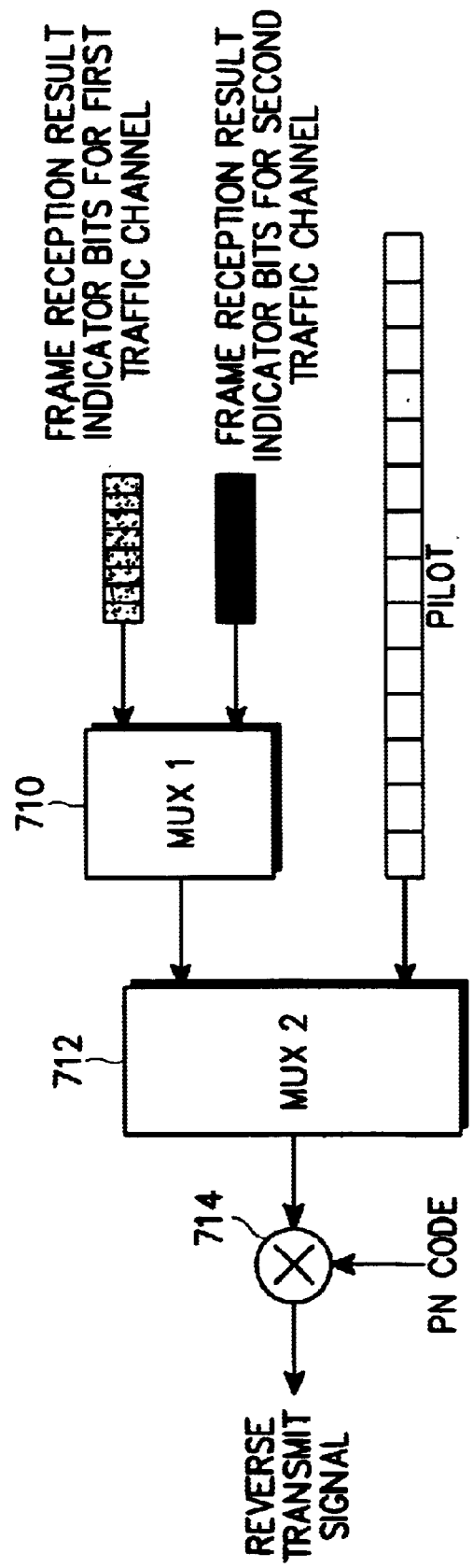
FIG. 7A is a partial block diagram illustrating an embodiment of the mobile station transmitter in conjunction with generation of a reverse transmit frame in the mobile communication system according to the present invention.
Figure 7B:
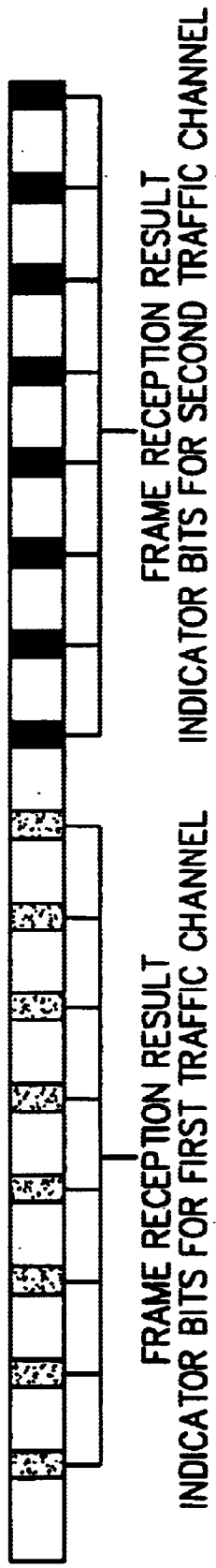
FIG. 7B is a partial block diagram illustrating an embodiment of the base station receiver in conjunction with processing the reverse frame received from the receiver shown in FIG. 7A in the mobile communication system according to the present invention.

FIG. 7A is a block diagram of an embodiment of a reverse transmit frame generating device in the mobile station according to the present invention. Referring to FIG. 7A, a first multiplexer (MUX1) 710 multiplexes the frame reception result indicator bits for the first and second traffic channel frames received from the structures shown in FIGS. 6A and 6B. The MUX1 710 may output the consecutive frame reception result indicator bits for the first traffic channel frame and then the frame reception result indicator bits for the second traffic channel frame. Or the MUX 1 710 multiplexes the frame reception result indicator bits for the first and second traffic channel frames bit by bit. A second multiplexer (MUX2) 712 multiplexes in time a pilot signal and the multiplexed frame reception result indicator bits in such a way that one reception result indictor bit is inserted in each PCG. A multiplier 714 spreads the output of the MUX2 712 with a PN code agreed between the base station and the mobile station and transmits the spread signal as a reverse transmit frame. The MUX1 710 and the MUX2 712 can be incorporated to an equivalent 3-way MUX.

In operation, the MUX1 710 multiplexes the frame reception result indicator bits for the first and second traffic channel frames received from the frame reception result deciders 618 and 626 shown in FIGS. 6A and 6B. The multiplexing operation can be designed in a diverse way according to how the MUX1 710 is controlled. Two multiplexing ways were described above. One of them is to successively output the frame reception result indicator bits for the second traffic channel frame following the consecutive frame reception result indicator bits for the first traffic channel frame. The other is to alternately select the frame reception result indicator bits for the first and second traffic channel frames. Though not shown, a controller is required for control of the MUX1 710, regardless of whether the controller provides overall control to the receiver, or separately for the MUX1 710 only.

The MUX2 712 multiplexes in time the multiplexed frame reception result indicator bits and a pilot signal so that one reception result indicator bit is inserted in each PCG. This is possible by controlling the MUX2 712 to select a reception result indicator bit at the moment when the pilot signal reaches a predetermined position. A period of inserting the frame reception result indicator bits on a bit basis and their positions may vary depending on design. The multiplier 714 multiplies the time-multiplexed signal received from the MUX2 712 by a predetermined PN code that identifies the transmitter (base station) and transmits the PN-spread signal as a reverse transmit frame.

FIGS. 4B and 4C illustrates embodiments of a reverse transmit frame structure. The frame shown in FIG. 4B is generated when the MUX1 710 first selects a predetermined number (e.g., 8 bits) of frame reception result indicator bits for the first traffic channel frame and then the predetermined number of frame reception result indicator bits for the second traffic channel frame. The first eight control bits in the frame are set as the reception result bits for the first traffic channel frame, and the last eight control bits are the same as the reception result bits for the second traffic channel frame. On the other hand, the frame shown in FIG. 4C is generated when the MUX1 710 alternately selects the reception result bits for the first and second traffic channel frames. As stated above, diverse reverse transmit frame patterns can be produced depending on how the MUX1 710 is controlled.

Second Embodiment

Figure 8A:
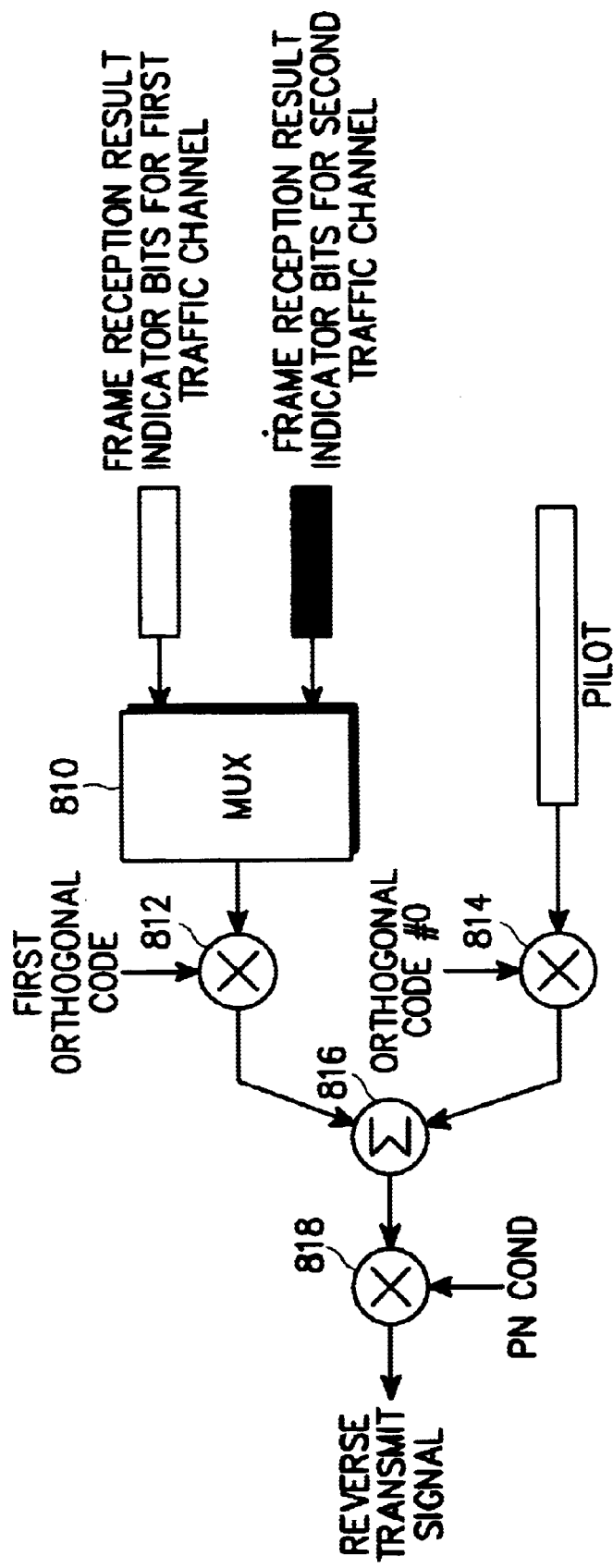
FIG. 8A is a partial block diagram illustrating another embodiment of the mobile station transmitter in conjunction with generation of a reverse transmit frame in the mobile communication system according to the present invention.

FIG. 8A is a block diagram of another embodiment of the reverse transmit frame generating device in the mobile station according to the present invention. Referring to FIG.

8A, a MUX 810 multiplexes the frame reception result indicator bits for the first and second traffic channel frames received from the structures shown in FIGS. 6A and 6B. A multiplier 812 multiplies the multiplexed frame reception result indicator bits by the first orthogonal code, for modulation. A multiplier 814 multiplies a pilot signal by a predetermined orthogonal code (orthogonal code #0, $W_0$), for modulation. An adder 816 adds up the modulated frame reception result indicator bits and the modulated pilot signal. A multiplier 818 spreads the output signal of the adder 816 with a predetermined PN code and transmits the PN-spread signal as a reverse transmit frame. A feature of this embodiment lies in that a new code channel (the first orthogonal code) is assigned to the frame reception result indicator bits.

In operation, the MUX 810 multiplexes the frame reception result indicator bits for the first and second traffic channel frames received from the frame reception result deciders 618 and 626 shown in FIGS. 6A and 6B. The multiplexing operation can be designed in a diverse way according to how the MUX 810 is controlled, as stated above in connection with FIG. 7A. The multiplier 812 modulates the multiplexed frame reception result indicator bits with the first orthogonal code by multiplying them. The modulation provides channelization. Meanwhile, the multiplier 814 modulates the pilot signal with the typical pilot signal orthogonal code, $W_0$ by multiplying them. The adder 816 adds up the modulated signals received from the multipliers 812 and 814. It can be said that the multiplication and then addition of the orthogonally spread signals is code multiplexing of the frame reception result indicator bits and the pilot signal. The multiplier 818 multiplies the code-multiplexed signal by a PN code and transmits the PN-spread signal as a reverse transmit frame.

Figure 8B:
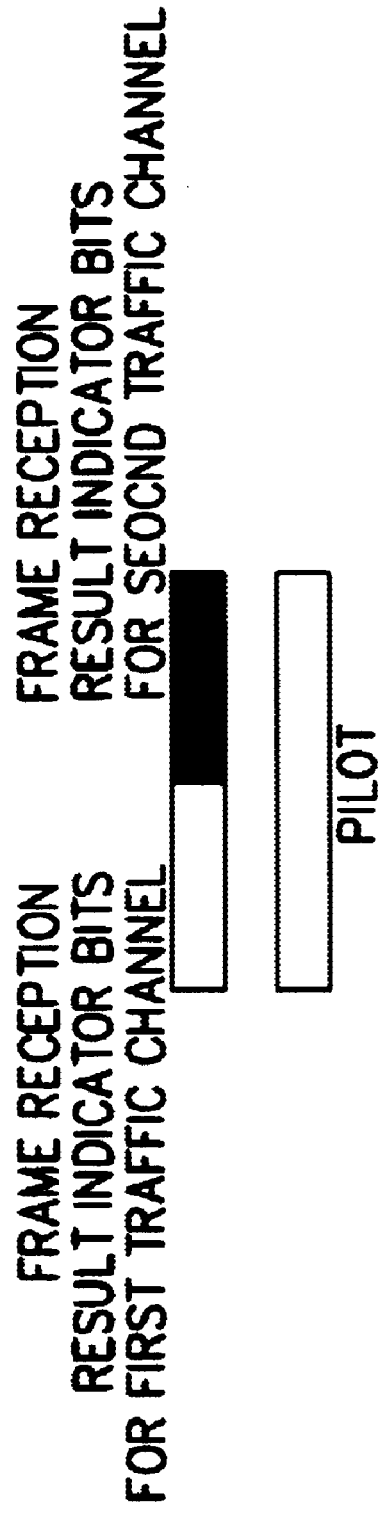
FIG. 8B illustrates the structure of the reverse transmit frame generated in the receiver shown in FIG. 8A.

The reverse transmit frame is illustrated in FIG. 8B. The frame reception result indicator bits are transmitted on a code channel corresponding to the first orthogonal code and the pilot signal on a code channel corresponding to $W_0$ in the reverse transmit frame. Here, the first half of the frame reception result indicator bits are assigned for the first traffic channel frame and the last half for the second traffic channel frame.

Third Embodiment

Figure 9A:
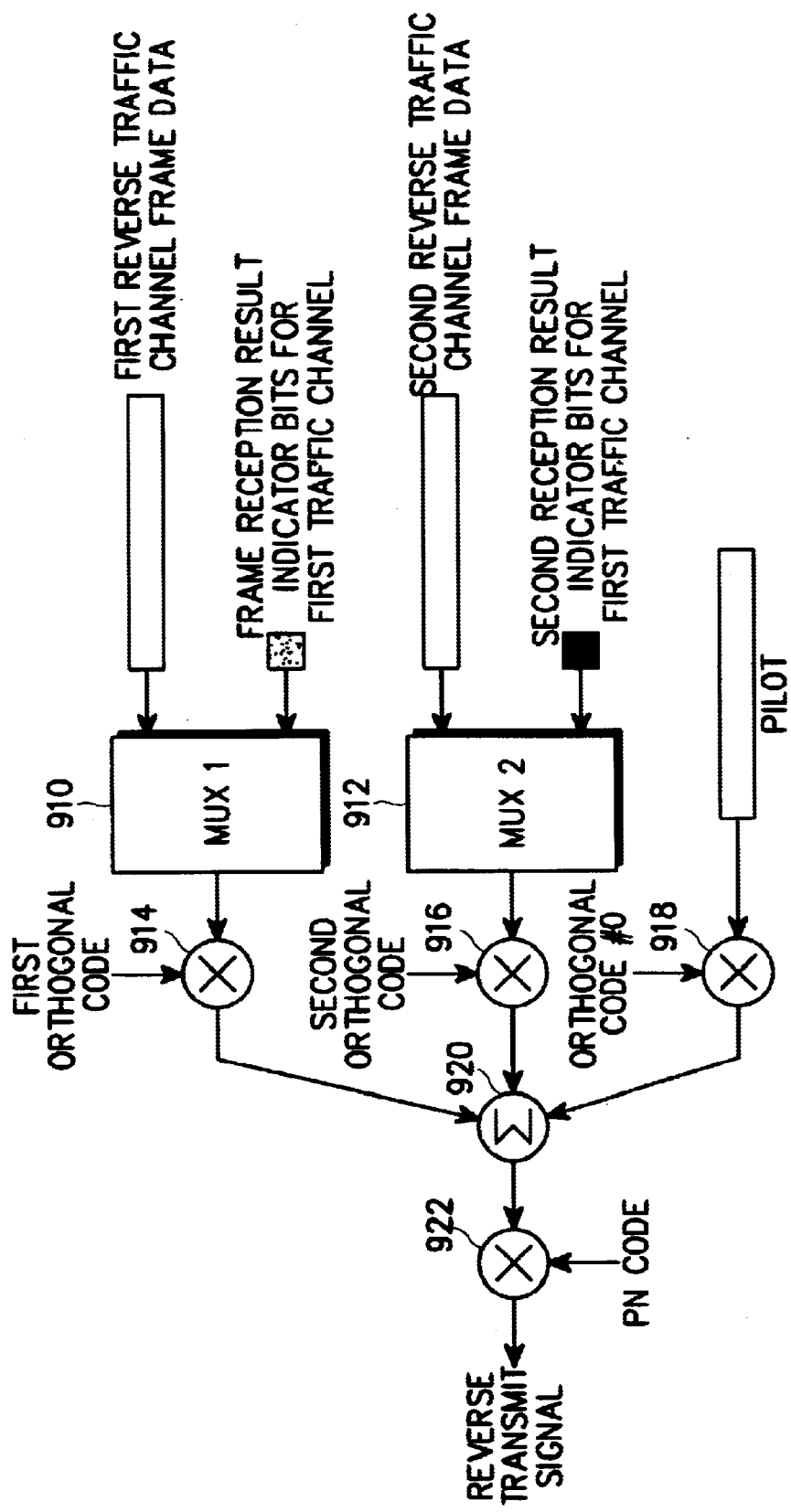
FIG. 9A is a partial block diagram illustrating a third embodiment of the mobile station transmitter in conjunction with generation of a reverse transmit frame in the mobile communication system according to the present invention.

FIG. 9A is a block diagram of a third embodiment of the reverse transmit frame generating device in the mobile station according to the present invention. Referring to FIG. 9A, a MUX1 910 multiplexes in time first reverse traffic channel frame data and the frame reception result indicator bits for the first traffic channel frame received from the structure shown in FIG. 6A. A MUX2 912 multiplexes in time second reverse traffic channel frame data and the frame reception result indicator bits for the second traffic channel frame received from the structure shown in FIG. 6B. A multiplier 914 modulates the multiplexed signal received from the MUX1 910 with the first orthogonal code by multiplying them. A multiplier 916 modulates the multiplexed signal received from the MUX2 912 with a second orthogonal code by multiplying them. A multiplier 918 modulates the pilot signal with the predetermined orthogonal code (orthogonal code #0, $W_0$) by multiplying them. An adder 920 sums the output signals of the multipliers 914, 916, and 918. A multiplier 922 multiplies the sum by the predetermined PN code and transmits the PN-spread signal as a reverse transmit frame.

In operation, the MUX1 910 multiplexes in time the first reverse traffic channel frame data and the frame reception result indicator bits for the first traffic channel frame received from the frame reception result decider 618 shown in FIG. 6A. The MUX2 912 multiplexes in time the second reverse traffic channel frame data and the frame reception result indicator bits for the second traffic channel frame received from the frame reception result decider 626 shown in FIG. 6B. Diverse multiplexing operations can be produced depending on methods of controlling the MUX1 910 and the MUX2 912. The multiplier 914 modulates the multiplexed signal received from the MUX1 910 with the first orthogonal code by multiplying them. The multiplier 916 modulates the multiplexed signal received from the MUX2 912 with the second orthogonal code by multiplying them. The multiplier 918 modulates the pilot signal with $W_0$ by multiplying them. The adder 920 sums the output signals of the multipliers 914, 916, and 918. It can be said that the multiplication and then addition of the orthogonally spread signals is code multiplexing of the frame reception result indicator bits and the pilot signal. The multiplier 922 multiplies the code-multiplexed signal by the predetermined PN code that identifies the base station and transmits the PN-spread signal as a reverse transmit frame.

Figure 9B:
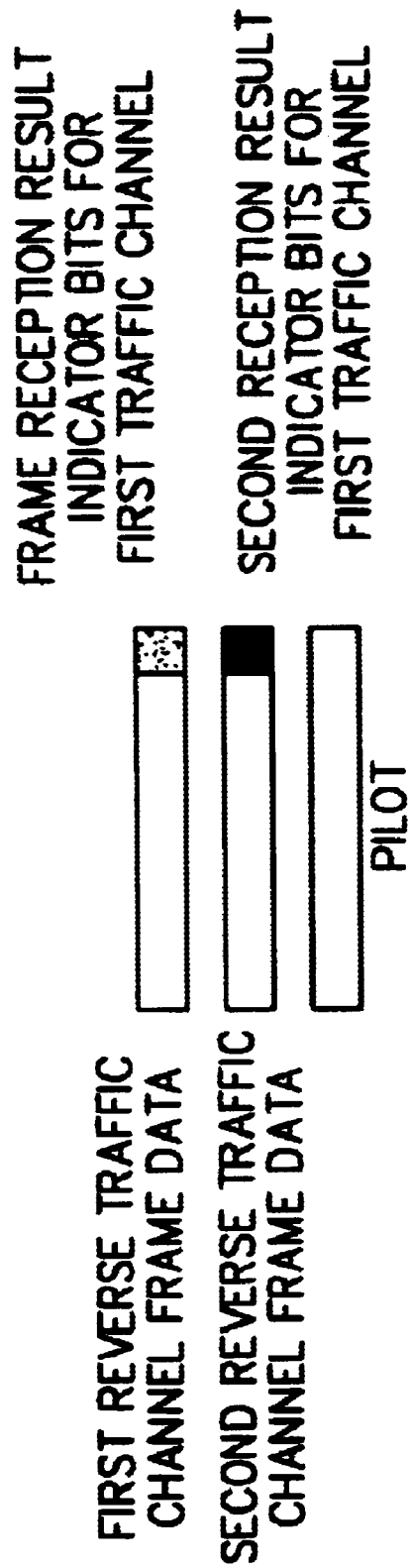
FIG. 9B illustrates the structure illustrating the reverse transmit frame generated in the receiver shown in FIG. 9A.

The reverse transmit frame is illustrated in FIG. 9B. The frame reception result indicator bits for the first traffic channel frame and the first reverse traffic channel data are transmitted on the code channel corresponding to the first orthogonal code, the frame reception result indicator bits for the second traffic channel frame and the second reverse traffic channel data on the code channel corresponding to the second orthogonal code, and the pilot signal on the code channel corresponding to $W_0$ in the reverse transmit frame.

Fourth Embodiment

Figure 10A:
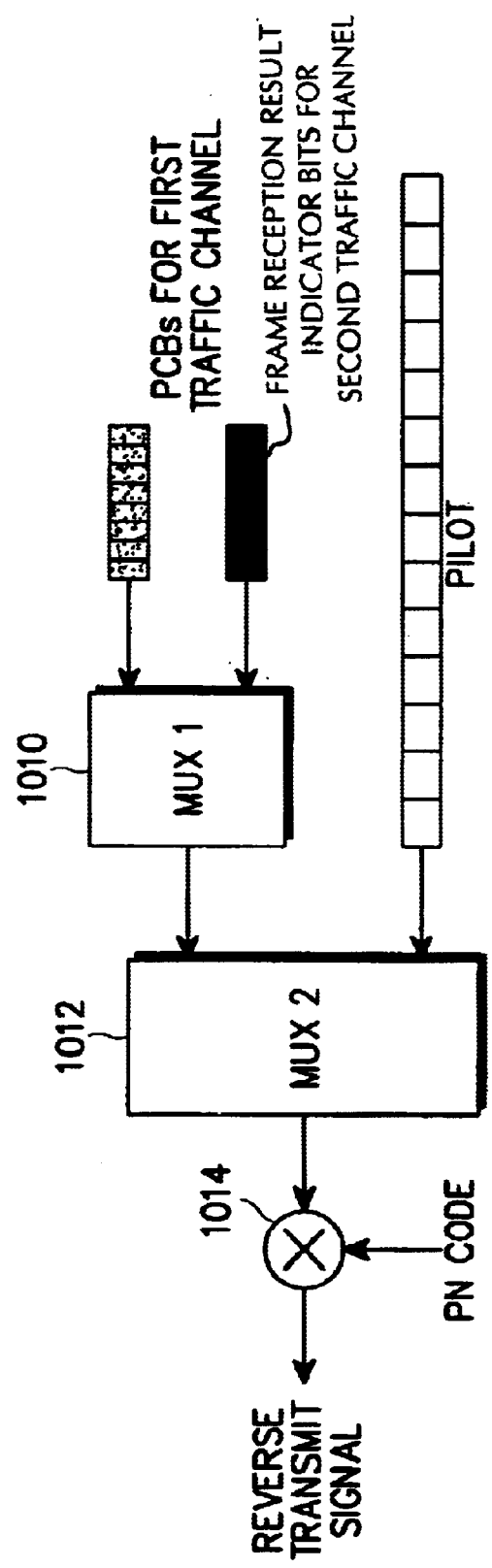
FIG. 10A is a partial block diagram illustrating a fourth embodiment of the mobile station transmitter in conjunction with generation of a reverse transmit frame in the mobile communication system according to the present invention.

FIG. 10A is a block diagram of a fourth embodiment of the reverse transmit frame generating device in the mobile station according to the present invention. Referring to FIG. 10A, a MUX1 1010 alternately outputs PCBs for the first traffic channel and the frame reception result indicator bits for the second traffic channel received from the structure shown in FIG. 6B. A MUX2 1012 multiplexes in time the multiplexed signal received from the MUX 1010 and the pilot signal so that one PCB or one frame reception result indicator bit is inserted in each PCG. A multiplier 1014 spreads the multiplexed signal received from the MUX2 1012 with the predetermined PN code agreed between the transmitter and the receiver and outputs the PN-spread signal as a reverse transmit frame. The MUX1 1010 and the MUX2 1012 can be incorporated to an equivalent 3-way MUX in which the PCBs and frame reception result indicator bits are alternately inserted into the pilot signal.

In operation, the MUX1 1010 multiplexes the PCBs for the first traffic channel and the frame reception result indicator bits for the second traffic channel received from the frame reception result decider shown in FIG. 6B. Diverse multiplexing operations can be produced depending on MUX1 controlling methods. In this embodiment, the MUX1 1010 alternately selects the PCBs and the frame reception indicator bits.

Though not shown, a controller is required for control of the MUX1 1010, regardless of whether the controller provides overall control to the receiver or separately for the MUX1 1010 only.

The MUX2 1012 multiplexes in time the multiplexed signal received from the MUX 1010 and the pilot signal so that one PCB or one frame reception result indicator bit is inserted in each PCG. This is possible by controlling the MUX2 1012 to select a reception result indicator bit at the moment when the pilot signal reaches a predetermined position. A period of inserting the frame reception result indicator bits on a bit basis and their positions may vary depending on designing. The multiplier 1014 spreads the multiplexed signal received from the MUX2 1012 with the predetermined PN code that identifies the base station and outputs the PN-spread signal as a reverse transmit frame.

The reverse transmit frame is illustrated in FIG. 4E. The frame reverse transmit frame is produced through the multiplexing operation of alternately selecting the PCBs for the first traffic channel and the frame reception result indicator bits for the second traffic channel in the MUX1 1010. Eight PCBs for the first traffic channel alternate with eight frame reception result indicator bits for the second traffic channel in the frame.

While the PCBs and the frame reception result indicator bits are identical in number (8:8) and alternate with each other, they may be allocated differently in number and pattern. Returning to FIG. 4F, the PCBs and the frame reception result indicator bits are assigned 3:1 in number. This embodiment also applies to the case with traffic channel more than two and the case that frame reception result indicator bits are transmitted for the first traffic channel and PCBs for the second traffic channel.

The first to fourth embodiments of the reverse transmit frame generating device in the mobile station according to the present invention have been described above based on the premise that the second traffic channel frame has CRC information. Due to lack of energy measurement symbols as mentioned earlier in the second traffic channel frame, it is impossible to obtain frame reception result indicator bits for the second traffic channel if it is released. In this case, there is no need for transmitting the reception result of the second traffic channel frame. Consequently, 16 control bits are assigned as the frame reception result indicator bits for the first traffic channel frame in one frame as in the conventional method of transmitting the reception result of the first traffic channel frame.

Now, a description of embodiments of a device for processing a reverse frame received from the receiver in the transmitter according to the present invention will be given in detail with reference to FIGS. 7C, 8C, 9C, and 10B.

First Embodiment

Figure 7C:
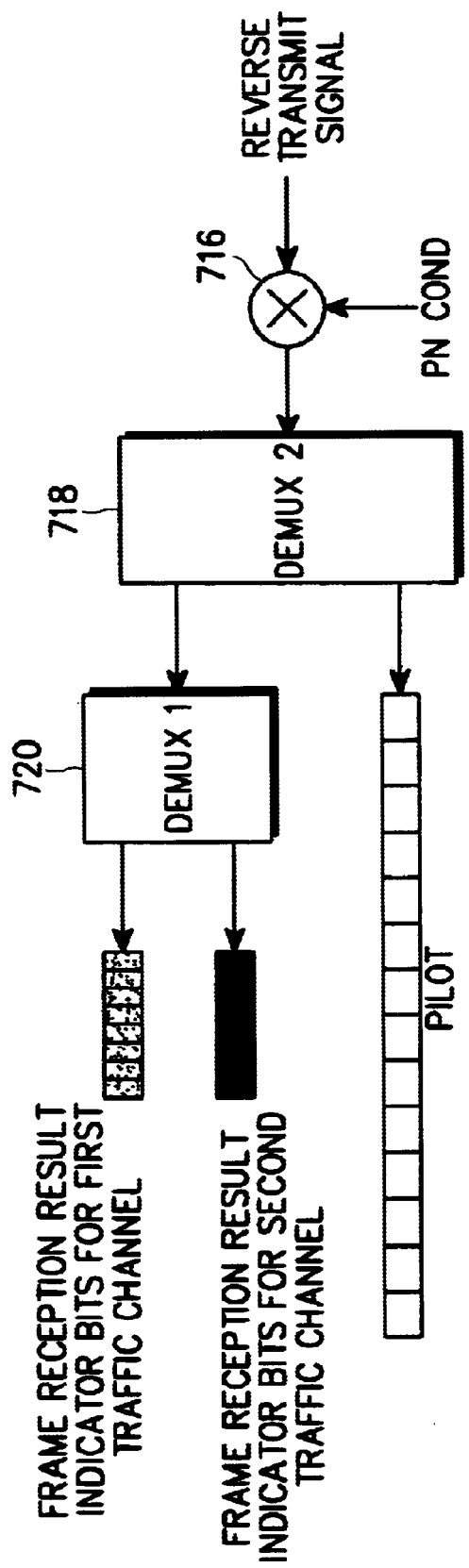

FIG. 7C is a block diagram of an embodiment of the input reverse frame receiver in the base station in conjunction with the transmitter in the mobile station shown in FIG. 7A according to the present invention. Referring to FIG. 7C, a multiplier 716 despreads an input reverse frame with the same PN code as used in the receiver. The reverse frame is in the format shown in FIG. 4B. A second demultiplexer (DEMUX2) 718 demultiplexes the despread signal in time into a pilot signal and multiplexed frame reception result indicator bits. A first demultiplexer (DEMUX1) 720 demultiplexes the separated multiplexed frame reception indicator bits into frame reception indicator bits for the first traffic channel and frame reception indicator bits for the second traffic channel. The DEMUX1 720 and the DEMUX2 718 may be incorporated to an equivalent 3-way DEMUX.

In operation, a reverse frame in the format shown in FIG. 4B is applied to the input of the multiplier 716. The multiplier 716 despreads the input reverse frame with the PN code used in the receiver by multiplying them. The DEMUX2 718 demultiplexes in time the despread signal. The demultiplexing in time refers to the process of separating the pilot signal from the despread signal, that is, extracting the multiplexed frame reception indicator bits for the first and second traffic channels inserted into the pilot signal on a bit basis in the input signal. This is possible by controlling the DEMUX2 718 to output the multiplexed frame reception indicator bits to an output terminal thereof at the end of a predetermined period while outputting the pilot signal to the other output terminal. A period of extracting the frame reception indicator bits inserted on a bit basis can be changed depending on design. For example, if one PCG is 1.25 ms in duration, the period is about 0.0694 ms (dividing 1.25 ms by 18). Hence, the pilot signal is output for (1.25 ms-about 0.0694 ms) and then the frame reception indicator bits are extracted for the remainder period of about 0.0694 ms.

The DEMUX1 720 demultiplexes the multiplexed frame reception indicator bits into the frame reception indicator bits for the first traffic channel and the frame reception indicator bits for the second traffic channel. Diverse demultiplexing operations can be produced depending on methods of controlling the DEMUX1 720. According to this embodiment, the demultiplexing is performed such that the frame reception indicator bits for the second traffic channel follows those for the first traffic channel. DEMUX control bits as many as the frame reception indicator bits for the first traffic channel and DEMUX control bits as many as the frame reception indicator bits for the second traffic channel are needed for implementation of the demultiplexing. For example, if there are eight frame reception indicator bits for the first traffic channel and eight frame reception indicator bits for the second traffic channel, 16 control bits are needed to control the DEMUX1 720. The values of the control bits used to select the frame reception indicator bits for the first and second traffic channels, respectively, can be freely determined. Though not shown, a controller is required for control of the DEMUX1 720, regardless of whether the controller provides overall control to the transmitter or separately for the DEMUX1 720 only.

The final frame reception indicator bits for the first and second traffic channels are used to control gains of the first and second traffic channels, which is well known and thus will not be described herein.

The reverse frame processing device according to the first embodiment of the present invention operates with respect to a reverse frame having consecutive frame reception indicator bits for the second traffic channel frame following consecutive frame reception indicator bits for the first traffic channel. It may also operate with a reverse frame having the frame reception indicator bits for the first traffic channel alternating with those for the second traffic channel by controlling the DEMUX1 720 to alternately select the frame reception indicator bits for the first and second traffic channels to different output terminals thereof. Such a reverse frame is illustrated in FIG. 4C.

Second Embodiment

Figure 8C:
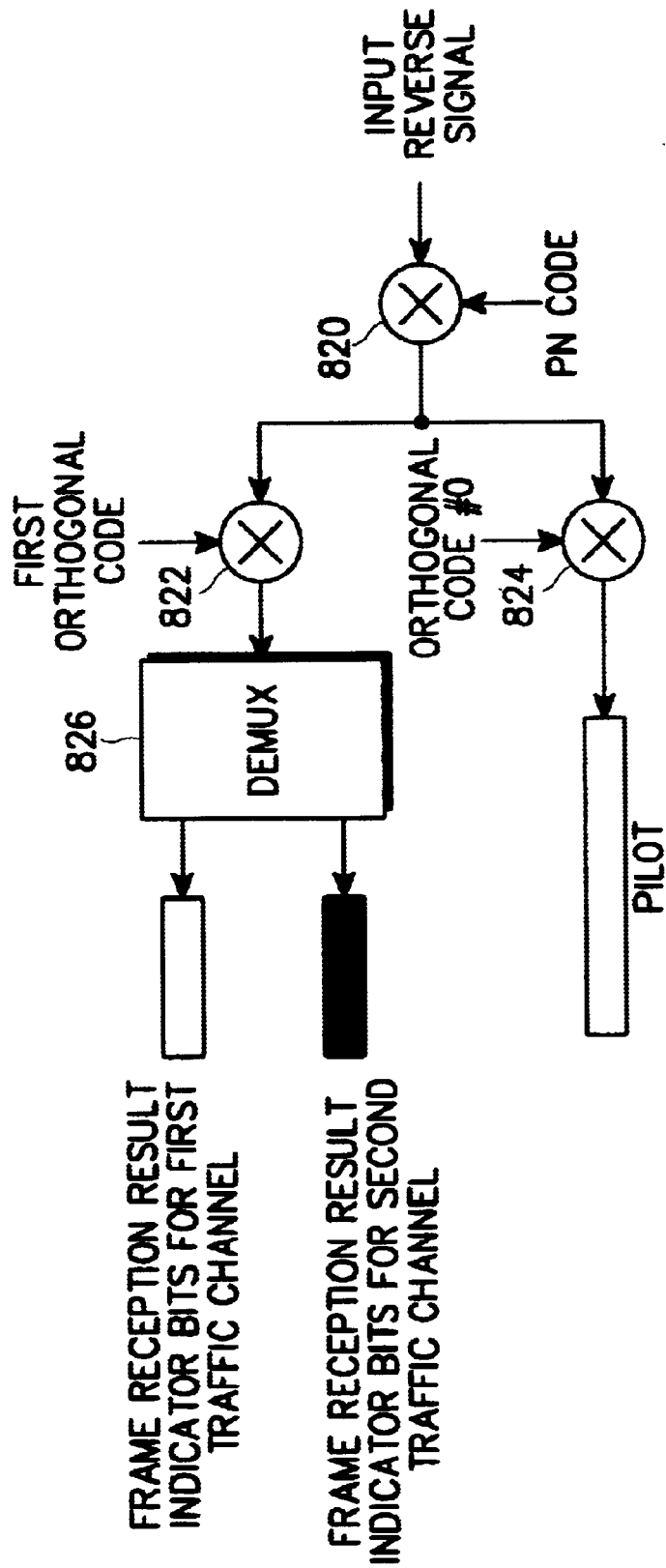
FIG. 8C is a partial block diagram illustrating another embodiment of the base station receiver in conjunction with processing the reverse frame received from the receiver shown in FIG. 8A in the mobile communication system according to the present invention.

FIG. 8C is a block diagram of another embodiment of the reverse frame receiver in the base station in conjunction with the transmitter of a mobile station shown in FIG. 8A according to the present invention. Referring to FIG. 8C, a multiplier 820 despreads an input reverse frame with the same PN code as used in the receiver. The reverse frame is in the format shown in FIG. 8B. A multiplier 822 demodulates the multiplexed frame reception result indicator bits with the first orthogonal code identical to that used for modulation in the receiver. A multiplier 824 demodulates the pilot signal with orthogonal code #0, $W_0$. A DEMUX 826 demultiplexes the multiplexed frame reception indicator bits into the frame reception indicator bits for the first traffic channel and the frame reception indicator bits for the second traffic channel. The demultiplexing must correspond to the multiplexing in the receiver.

In operation, a reverse frame in the format shown in FIG. 8B is applied to the input of the multiplier 820. The multiplier 820 despreads the reverse frame with the same PN code as used in the receiver by multiplying them. The multiplier 824 multiplies the despread reverse frame by $W_0$, thereby removing the frame reception indicator bits modulated with a different orthogonal code and demodulating the pilot signal. The multiplier 822 multiples the despread reverse frame by the first orthogonal code, thereby removing the pilot signal and demodulating the frame reception indicator bits. The DEMUX 826 separates the frame reception result indicator bits for the first and second traffic channels from the output of the multiplier 822.

The final frame reception indicator bits for the first and second traffic channels are used to control gains of the first and second traffic channels, which is well known and thus will not be described herein.

Third Embodiment

Figure 9C:
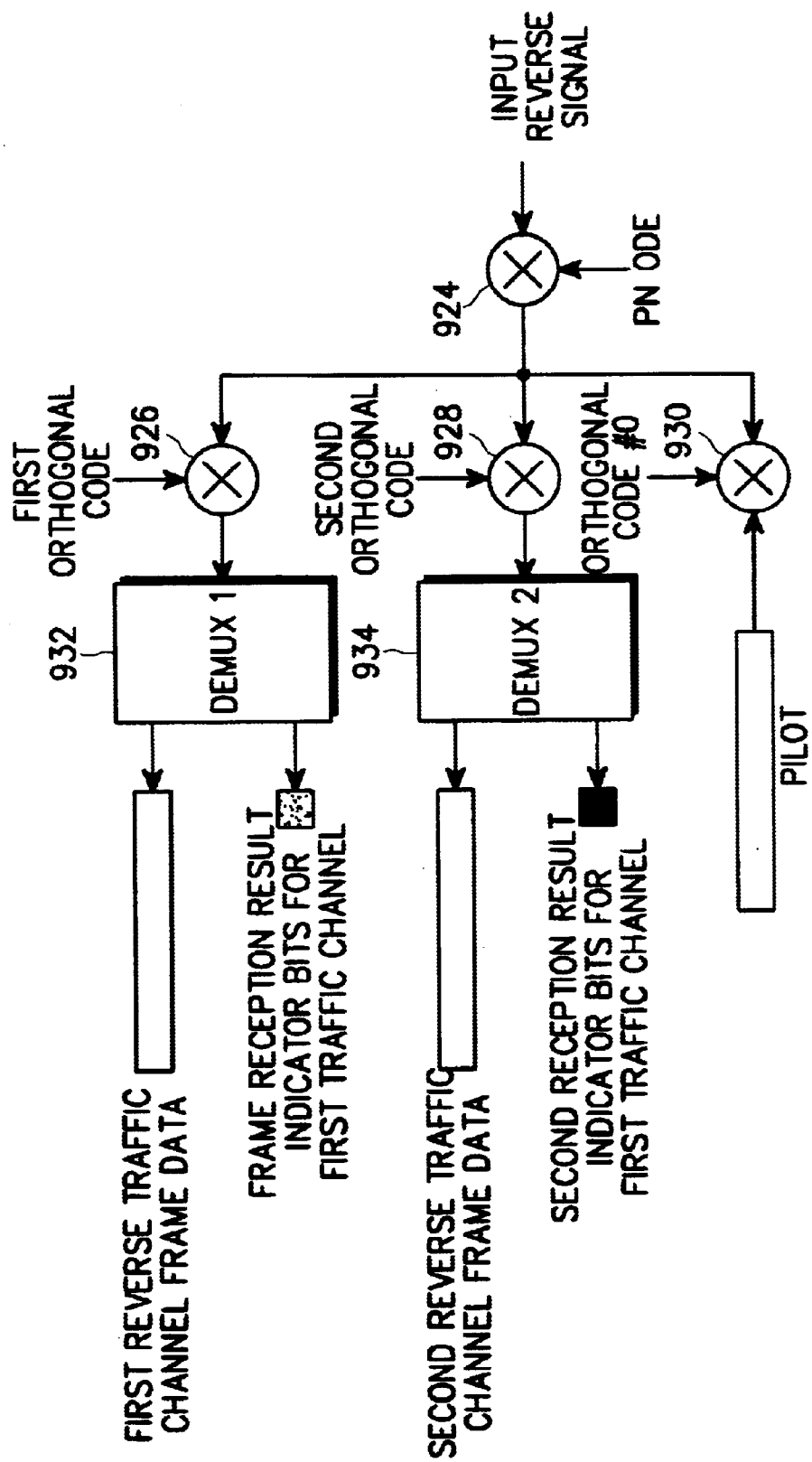
FIG. 9C is a partial block diagram illustrating a third embodiment of the base station receiver in conjunction with processing the reverse frame received from the receiver shown in FIG. 8A in the mobile communication system according to the present invention.

FIG. 9C is a block diagram of a third embodiment of the reverse frame receiver in the transmitter in conjunction with the transmitter in the mobile station shown in FIG. 9A according to the present invention. Referring to FIG. 9C, a multiplier 924 despreads an input reverse frame with the same PN code as used in the receiver. The reverse frame is in the format shown in FIG. 9B. A multiplier 926 demodulates the multiplexed signal including the frame reception result indicator bits for the first traffic channel frame and the first reverse traffic channel frame data by multiplying the despread signal by the first orthogonal code. A multiplier 928 demodulates the frame reception result indicator bits for the second traffic channel frame and the second reverse traffic channel frame data by multiplying the despread signal by the second orthogonal code. The first and second orthogonal codes are identical to those used for modulation in the receiver. A multiplier 930 demodulates the pilot signal with orthogonal code #0, $W_0$. A DEMUX1 932 demultiplexes the output of the multiplier 926 into the frame reception indicator bits for the first traffic channel and the first reverse traffic channel frame data. A DEMUX2 934 demultiplexes the output of the multiplier 928 into the frame reception indicator bits for the second traffic channel and the second reverse traffic channel frame data. The demultiplexing must correspond to the multiplexing in the receiver.

In operation, a reverse frame in the format shown in FIG. 9B is applied to the input of the multiplier 924. The multiplier 924 despreads the reverse frame with the same PN code as used in the receiver by multiplying them. The multiplier 930 multiplies the despread reverse frame by $W_0$, thereby removing the other signals modulated with different orthogonal codes and demodulating the pilot signal. The multiplier 926 multiples the despread reverse frame by the first orthogonal code, thereby demodulating only the multiplexed signal including the frame reception indicator bits for the first traffic channel and the first reverse traffic channel frame data. The multiplier 928 multiples the despread reverse frame by the second orthogonal code, thereby demodulating only the multiplexed signal including the frame reception indicator bits for the second traffic channel and the second reverse traffic channel frame data. The DEMUX1 932 separates the frame reception result indicator bits for the first traffic channel and the first reverse traffic frame data from the output of the multiplier 926. The DEMUX2 934 separates the frame reception result indicator bits for the second traffic channel and the second reverse traffic frame data from the output of the multiplier 928.

The final frame reception indicator bits for the first and second traffic channels are used to control gains of the first and second traffic channels, which is well known and thus will not be described herein.

Fourth Embodiment

Figure 10B:
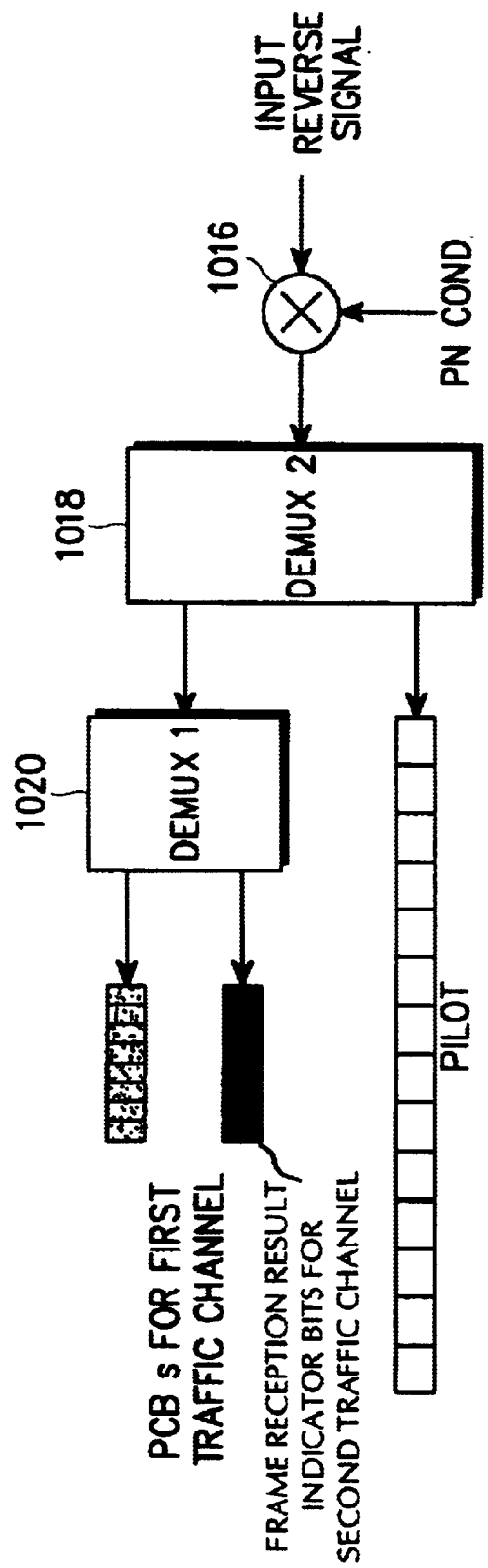
FIG. 10B is a partial block diagram illustrating a fourth embodiment of the base station receiver in conjunction with processing the reverse frame received from the receiver shown in FIG. 10A in the mobile communication system according to the present invention.

FIG. 10B is a block diagram of a fourth embodiment of the reverse frame receiver in the base station in conjunction with the transmitter in a mobile station shown in FIG. 10A according to the present invention. Referring to FIG. 10B, a multiplier 1016 despreads an input reverse frame with the same PN code as used in the receiver. The reverse frame is in the format shown in FIG. 4E. A DEMUX2 1018 demultiplexes in time the despread signal into the pilot signal and the multiplexed traffic channel control bits. A DEMUX1 1020 demultiplexes the PCBs for the first traffic channel and the frame reception result indicator bits for the second traffic channel.

In operation, a reverse frame in the format shown in FIG. 4E is applied to the input of the multiplier 1016. The multiplier 1016 despreads the reverse frame with the same PN code as used in the receiver by multiplying them. The DEMUX2 1018 separates the multiplexed traffic channel control bits inserted on a bit basis and the pilot signal from the despread signal by controlling the DEMUX2 1018 to output the multiplexed frame reception indicator bits to an output terminal thereof at the end of a predetermined period while outputting the pilot signal to the other output terminal. A period of extracting the frame reception indicator bits inserted on a bit basis can be changed depending on design.

The DEMUX1 1020 demultiplexes the PCBs for the first traffic channel and the frame reception result indicator bits for the second traffic channel. The demultiplexing can be implemented in diverse ways depending on how the DEMUX1 1020 is controlled. In this embodiment, the demultiplexing is implemented so that the PCBs and the frame reception result indicator bits are alternately selected.

The PCBs for the first traffic channel and the frame reception indicator bits for the second traffic channel are used to control gains of the first and second traffic channels. While the PCBs may have different values in different PCGs, each of the frame reception result indicator bits has the same value in one frame.

In accordance with the present invention, a mobile station receiver, receiving two or more channels from a base station transmitter, multiplexes frame reception result indicator bits for the channels prior to transmission so that the base station transmitter can control its transmission power based on the frame reception result indicator bits. Also, the mobile station receiver can multiplex frame reception result indicator bits and PCBs according to channels prior to transmission so that the base station may perform a slow power control and a fast power control for the different traffic channels at the same time.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of reporting the reception states of first information received on a first traffic channel and second information received on a second traffic channel in one frame from a base station in a mobile station, comprising the steps of:

allocating bits indicating the reception states of the first and second information to slots of a reverse frame; and transmitting the reverse frame;

wherein the reception state indicating bits of the first information are power control bits (PCBs) for power control on a slot basis and the reception state indicating bits of the second information are reception result indicator bits for power control on a frame basis.

2. The method of claim 1, wherein the reception state indicating bits of the first information and the reception state indicating bits of the second information are alternatively allocated.

3. The method of claim 1, wherein the reception state indicating bits of the first information are transmitted at a 400 bps data rate and the reception state indicating bits of the second information are transmitted at a 50 bps data rate.

4. The method of claim 1, wherein the reception state indicating bits of the second information are EIBs (Erasure Indicator Bits).

5. The method of claim 1, wherein the reverse frame is a pilot channel frame.

6. A method of controlling transmission power of traffic channels in a base station which transmits a first information on a first traffic channel and a second information on a second traffic channel in one frame to a mobile station, wherein a reception result of the first and second information is received from the mobile station, comprising the steps of:

receiving a reverse frame having reception state indicating bits of the first information and reception state indicating bits of the second information in a plurality of slots; and separating the reception state indicating bits from the reverse frame according to the first and second information and performing a power control on the first and second traffic channels according to the first and second information;

wherein the reception state indicating bits of the first information are PCBs for power control on a slot basis and the reception state indicating bits of the second information are reception result indicator bits for power control on a frame basis.

7. The method of claim 6, wherein the reception state indicating bits of the first information and the reception state indicating bits of the second information are alternatively allocated.

8. The method of claim 6, wherein the reception state indicating bits of the first information are transmitted at a 400 bps data rate and the reception state indicating bits of the second information are transmitted at a 50 bps data rate.

9. The method of claim 6, wherein the reception state indicating bits of the second information are EIBs (Erasure Indicator Bits).

10. The method of claim 6, wherein the reverse frame is a pilot channel frame.

11. A mobile station for receiving first information on a first traffic channel and second information on a second traffic channel in one frame from a base station and reporting the reception results of the first and second information to the base station, comprising:

a first multiplexer (MUX) for multiplexing reception state indicating bits of the first and second information; and a second MUX for sequentially allocating the multiplexed reception state indicating bits of the first and second information in slots of a reverse frame, each slot having one reception state indicating bit.

12. The mobile station of claim 11, wherein the first MUX alternately outputs the reception state indicating bits of the first information with the reception state indicating bits of the second information.

13. The mobile station of claim 11, wherein the reception state indicating bits of the first information are transmitted at a 400 bps data rate and the reception state indicating bits of the second information are transmitted at a 50 bps data rate.

14. The mobile station of claim 11, wherein the reception state indicating bits of the second information are EIBs (Erasure Indicator Bits).

15. The mobile station of claim 11, wherein the reception state indicating bits of the first information are PCBs for power control on a slot basis and the reception state indicating bits of the second information are reception result indicator bits for power control on a frame basis.

16. The mobile station of claim 11, wherein the reverse frame is a pilot channel frame.

17. A base station for transmitting first information on a first traffic channel and second information on a second traffic channel in one frame to a mobile station and receiving the reception results of the first and second information from the mobile station, comprising:

a first demultiplexer (DEMUX) for receiving a reverse frame having a plurality of slots and for separating reception state indicating bits of the first and second information multiplexed by the mobile station from the reverse frame; and a second DEMUX for demultiplexing the multiplexed reception state indicating bits into the reception state indicating bits of the first information and the reception state indicating bits of the second information.

18. The base station of claim 17, wherein the multiplexed reception state indicating bits of the first and second information alternate in alternating slots of the reverse frame.

19. The base station of claim 17, wherein the state indicating bits of the first information are transmitted at a 400 bps data rate and the reception state indicating bits of the second information are transmitted at a 50 bps data rate.

20. The base station of claim 17, wherein the reception state indicating bits of the second information are EIBs (Erasure Indicator Bits).

21. The base station of claim 17, wherein the reception state indicating bits of the first information are PCBs for power control on a slot basis and the reception state indicating bits of the second information are reception result indicator bits for power control on a frame basis.

22. The base station of claim 17, wherein the reverse frame is a pilot channel frame.

23. A mobile communication system having frames transmitted on at least two traffic channels, the mobile communication system comprising:

a mobile station for receiving the frames on the at least two traffic channels and transmitting reception state indicating bits for the at least two traffic channels in slots of a reverse frame; and a base station for receiving the reverse frame from the mobile station and extracting the reception state indicating bits for the at least two traffic channels from the reverse frame, and performing a power control on the individual two traffic channels based on the values of the reception state indicating bits;

wherein the mobile station comprises:
- a first MUX for multiplexing the reception state indicating bits for the at least two traffic channels; and
- a second MUX for sequentially allocating the reception state indicating bits in slots of the reverse frame, each slot having one reception state indicating bit.

24. The mobile communication system of claim 23, wherein the base station comprises:
- a first DEMUX for receiving the reverse frame and for separating the reception state indicating bits multiplexed by the receiver from the reverse frame; and
- a second DEMUX for demultiplexing the multiplexed reception state indicating bits into the reception state indicating bits for the individual traffic channels.

25. A method of reporting the reception results of frames received on at least two traffic channels in a mobile communication system, comprising the steps of:
- receiving the frames on the at least two traffic channel frames and transmitting reception state indicating bits of the received frames in slots of a reverse frame; and
- receiving the reverse frame, extracting the reception state indicating bits for the at least two traffic channels from the reverse frame, and performing a power control on the individual traffic channels based on the values of the reception state indicating bits;

wherein the reverse frame transmitting step comprises the steps of:
- multiplexing the reception state indicating bits for the at least two traffic channels; and
- sequentially allocating the reception state indicating bits in slots of the reverse frame, each slot having one reception state indicating bit.

26. The method of claim 25, wherein the step of extracting the reception state indicating bits comprises the steps of:
- extracting the reception state indicating bits multiplexed prior to transmission from the reverse frame; and
- demultiplexing the multiplexed reception state indicating bits into the reception state indicating bits for the individual traffic channels.

* * * * *